United States Patent Office 3,328,399
Patented June 27, 1967

3,328,399
PROCESS OF PREPARING AMINO-s-TRIAZINES
Erhard J. Prill, St. Louis, Mo., assignor to Monsanto Company, St. Louis, Mo., a corporation of Delaware
No Drawing. Filed Dec. 14, 1964, Ser. No. 418,291
4 Claims. (Cl. 260—249.5)

The present invention relates to the preparation of amino-s-triazines of the formula:

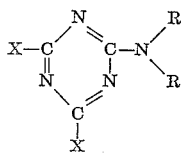

where X is a substituent selected from the group consisting of hydrogen, Cl, Br and

and each R, which may be the same or different, represents an alkyl radical of 1 to 18 carbon atoms. Typical R representations include methyl, ethyl, propyl, isopropyl, n-butyl, i-butyl, n-amyl, i-amyl, hexyl, heptyl, octyl, nonyl, decyl, undecyl, hexadecyl and octadecyl.

Dialkyl amino-s-triazines are known compounds and various procedures have been used to prepare them. Where dialkyl amino-s-triazines have been prepared by reacting cyanuric chloride with dialkyl amines in the presence of a solvent, the art teaches that it is necessary to neutralize the HCl formed in the reaction with (1) an excess of amine reactant or (2) an acide acceptor such as NaOH or NaHCO₃. Neutralization of the HCl by use of excess amine reactant or an acid acceptor complicates recovery of the amino-s-triazine and is uneconomical. Failure to neutralize the HCl results in low yields of amino-s-triazines.

An object of the present invention is a process for the preparation of amino-s-triazines. A further object is to prepare amino-s-triazines without neutralizing the HCl formed in the reaction.

The above and other objects of this invention are accomplished according to the process which comprises reacting (a) an s-triazine of the formula:

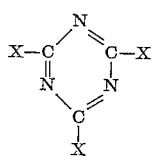

with (b) an amine of the formula:

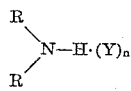

where X and R are defined as above, at least one X being selected from the group consisting of Cl and Br, n is a whole number from 0 to 1, when n is 0 the reactants are in a molar ratio of substantially 1 mol of (b) for each reactive halo group of (a) and when n is 1 Y is selected from the group consisting of HCl and HBr, under substantially anhydrous conditions in the presence of an organic solvent at a temperature at which the evolution of hydrogen halide selected from the group HCl and HBr and corresponding to the prior halogen selection of X above occurs, continuing the reaction until the evolution of hydrogen halide selected from the group HCl and HBr and corresponding to the prior halogen selection of X above substantially ceases, and recovering the amino-s-triazine from the organic solvent.

Thus in accordance with this invention the preparation of amino-s-triazines is carried out without the use of neutralizing agents for the HCl formed in the reaction by using critical reaction temperatures at which the evolution of HCl formed in the reaction occurs. An excess of dialkylamine hydrohalide can be used in the reaction since such compounds are not neutralizing agents. However an excess of dialkylamine reactant is a neutralizing agent and is to be avoided.

The following examples will serve to illustrate the present invention. Parts and percent are by weight unless otherwise indicated.

Example 1

A flask equipped with an agitator, thermometer, reflux condenser and safety feed funnel is successively charged with 92.3 grams (0.5 mol) cyanuric chloride, 54.8 grams (0.5 mol) anhydrous diethylamine hydrochloride and 100 ml. xylene at 25° C. Agitation is started and the temperature raised to about 125° C. where slow evolution of HCl occurs. The mixture is then refluxed at about 130 to 155° C. for about one hour at which time the evolution of HCl ceases. Heating is stopped and the mixture is allowed to cool to 90° C. when agitation is stopped. The reaction mixture is fractionally distilled under reduced pressure and the fraction boiling at about 102–104° C. at 0.8 mm. is collected. The 2,4-dichloro-6-diethylamino-s-triazine thus prepared amounts to 109 grams (98.5% yield).

Example 2

Into a flask equipped as in Example 1 is charged 43.7 grams (0.4 mol) anhydrous diethylamine hydrochloride and 88.5 grams (0.4 mol) of the 2,4-dichloro-6-diethylamine-s-triazine produced in Example 1. The contents are heated from 25° C. to 175° C. where slow evolution of HCl begins. Fifty ml. of solvent (Solvesso 100 aromatic hydrocarbon fraction, B.P. 156–177° C.) is then added to the flask, agitation started and the mixture refluxed at about 185–200° C. for about 2 hours at which time the evolution of HCl ceases. After cooling, the reaction mixture is fractionally distilled under reduced pressure and the fraction boiling at about 103–107° C. at 0.5 mm. is collected. The 2-chloro-4,6-bis(diethylamino)-s-triazine thus produced amounts to 77 grams (74.7% yield).

Example 3

A flask equipped as in Example 1 is successively charged with 25 ml. of solvent (Penola 150 aromatic hydrocarbon fraction, B.P. 190–203° C.), 27.4 grams (0.25 mol) anhydrous diethylamine hydrochloride and 63 grams (0.25 mol) of the 2-chloro-4,6-bis(diethylamino)-s-triazine produced in Example 2. Agitation is started and the mixture heated from 25° C. to 210° C. where evolution of HCl begins. The reaction mixture is refluxed at about 210° C.–235° C. for about 2½ hours at which time the evolution of HCl ceases. The reaction mixture is cooled and 100 ml. benzene added. This mixture is filtered with suction and the cake washed with an additional 50 ml. of benzene. Fractional distillation of the washed solids under reduced pressure (0.5 mm.) results in the recovery at about 118–123° C. of 67.5 grams (92% yield) 2,4,6-tris(diethylamino)-s-triazine.

Example 4

Examples 1, 2 and 3 above are repeated except that diethylamine is used in place of diethylamine hydrochloride. The stepwise reaction results in the preparation of 2,4-dichloro-6-diethylamino-s-triazine in 99% yield, 2-chloro-4,6-bis(diethylamino)-s-triazine in 96% yield and 2,4,6-tris(diethylamino)-s-triazine in 98% yield.

Example 5

A flask equipped with an agitator, thermometer, reflux condenser and safety feed funnel is successively charged with 92.3 grams (0.5 mol) cyanuric chloride, 164.4 grams (1.5 mol) anhydrous diethylamine hydrochloride and 100 ml. solvent (Penola 150 aromatic hydrocarbon fraction, B.P. 190–203° C.). Agitation is started and the mixture heated from 25° C. to about 140° C. After about one hour at 140° C. the reaction temperature is raised to 200° C. and held for about 2 hours. At the end of this period the reaction mixture is refluxed at about 225–240° C. for about an additional 3 hours at which time the evolution of HCl ceases. The reaction mixture is fractionally distilled under reduced pressure and the fraction boiling at about 118–123° C. (0.5 mm.) is recovered. The recovered material amounts to 141 grams of 2,4,6-tris(diethylamino)-s-triazine.

Example 6

In a flask equipped as in Example 1, a mixture of 92.3 grams (0.5 mol) cyanuric chloride, 120.5 grams (0.5 mol) dioctylamine and 100 ml. solvent (Penola 150 aromatic hydrocarbon fraction, B.P. 190–203° C.) is heated to about 150° C. After about one hour at 150° C., 36.5 grams (0.5 mol) diethylamine are added to the reaction mixture which is then heated to about 200° C. and held for about 2 hours. At the end of this time 232.5 grams (0.5 mol) of dihexadecylamine are added and the reaction mixture is then refluxed at 220–240° C. for about 3 hours at which time the evolution of HCl ceases. The product, 401 gm. of 2-diethylamino-4-dioctylamino-6-dihexadecylamino-s-triazine having molecular weight of 854.5, is recovered by fractional distillation of the reaction mixture.

When using dialkylamine reactant the process of this invention is carried out under conditions such that only one mol of dialkylamine is required for each reactive halogen of the s-triazine or amino-s-triazine reactant. Thus, a stoichiometric ratio of 1–3 mols dialkylamine is used for each mol of s-triazine or amino-s-triazine, the unit mol ratio depending on both the degree of amino substitution in the s-triazine reactant and the desired degree of amino substitution in the product. It will be noted that under no process conditions is there an excess of dialkylamine reactant present throughout the entire reaction.

As mentioned hereinbefore, the reaction must be carried out at a temperature at which evolution of HCl from the reaction medium occurs. The minimum reaction temperature at which evolution of HCl will occur is critical. These critical minimum reaction temperatures are about 120° C., 165° C. and 200° C. for the preparation of 2-, 2,4- and 2,4,6-dialkylamino substituted s-triazines, respectively. When reacting cyanuric chloride and a dialkylamine or dialkylamine hydrohalide to prepare a 2,4-dihalo-6-dialkylamino-s-triazine a temperature above about 120° C. is applicable with a temperature of 120° C. to 165° C. preferred. When reacting a 2,4-dihalo-6-dialkylamino-s-triazine and a dialkylamine or dialkylamine hydrohalide to prepare a 2-halo-4-dialkylamino-6-dialkylamino-s-triazine, a temperature above about 165° C. is applicable with a temperature of 165–200° C. preferred. When reacting a 2-halo-4-dialkylamino-6-dialkylamino-s-triazine with a dialkylamine or dialkylamine hydrohalide to produce a 2-dialkylamino - 4 - dialkylamino-6-dialkylamino-s-triazine, a temperature above about 200° C. is applicable with a temperature of 200–300° C. preferred.

When reacting cyanuric chloride with a dialkylamine or dialkylamine hydrohalide to prepare a 2,4,6-tris(dialkylamino)-s-triazine in a single reaction step, it is preferred to initiate the reaction at about 120° C., follow the course of the reaction by the evolution of HCl and increase the temperature to the required levels as the reaction proceeds. However, if desired the entire reaction may be carried out at a temperature above 200° C.

The reaction time is not critical and may vary widely depending on the reaction temperature employed. At a reaction temperature where evolution of HCl is vigorous the reaction time will be less than at a temperature where the evolution of HCl is moderate or slow.

The solvent used in accordance with this invention can be any organic solvent which does not interfere with the reaction. Preferably a hydrocarbon solvent is employed. It is preferred that the reaction be carried out under reflux conditions but such conditions are not required and solvents having a boiling point substantially above the required reaction temperature for evolution of HCl may be employed if desired. Examples of suitable solvents include the chlorinated aromatic hydrocarbons, xylene, dimethylnaphthalene, Penola 150 (B.P. 190–203° C., aromatic hydrocarbon fraction), Solvesso 100 (B.P. 156–177° C., aromatic hydrocarbon fraction), and Solvesso 150 (B.P. 185–213° C., aromatic hydrocarbon fraction).

Recovery of the amino-s-triazines from the reaction mixture can be effected by any of the well known methods such as fractional distillation, extraction, crystallization or mere solvent removal followed by washing. The method used will depend primarily on whether the product is a liquid or solid at room temperature and the degree of purity desired.

Examples of suitable dialkylamine reactants include: dimethylamine, diethylamine, di-n-propylamine, diisopropylamine, di-n-butylamine, diisobutylamine, di-sec-butylamine, di-n-amylamine, diisoamylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, methylethylamine, methylisopropylamine, methylhexylamine, methylnonylamine, methylpentadecylamine, methyloctadecylamine, ethylbutylamine, ethylheptylamine, ethyloctylamine, ethylpentadecylamine, amylhexadecylamine, amylpentadecylamine, hexylheptylamine, hexyloctylamine, hexyldodecylamine, hexylheptadecylamine, heptyloctylamine, heptyldecylamine, heptylpentadecylamine, heptyloctadecylamine, octyldecylamine, octylundecylamine, octyltetradecylamine, octylhexadecylamine, octyloctadecylamine, nonylundecylamine, nonylpentadecylamine, nonylheptadecylamine, decyltridecylamine, decylpentadecylamine, decyloctadecylamine, undecyltridecylamine, undecyloctadecylamine, dodecylpentadecylamine, tridecylpentadecylamine, tridecyloctadecylamine, tetradecylheptadecylamine, pentadecylheptadecylamine, hexadecylheptadecylamine and heptadecyloctadecylamine; and/or hydrohalides of the above.

Examples of suitable s-triazine reactants include:

2-chloro-s-triazine,
cyanuric chloride,
2,4-dichloro-6-diethylamino-s-triazine
2,4-dichloro-6-dihexylamino-s-triazine
2,4-dichloro-6-ethylhexylamino-s-triazine
2,4-dichloro-6-dioctylamino-s-triazine
2,4-dichloro-6-ethylheptylamino-s-triazine
2,4-dichloro-6-hexyldodecylamino-s-triazine
2,4-dichloro-6-heptyloctylamino-s-triazine
2,4-dichloro-6-octyloctadecylamino-s-triazine
2,4-dichloro-6-nonylheptadecylamino-s-triazine
2,4-dichloro-6-tridecylpentadecylamino-s-triazine
2,4-dichloro-6-tetradecylheptadecylamino-s-triazine
2-chloro-4,6-bis(diethylamino)-s-triazine
2-chloro-4,6-bis(dinonylamino)-s-triazine
2-chloro-4,6-bis(dihexadecylamino)-s-triazine
2-chloro-4,6-bis(ethyloctylamino)-s-triazine
2-chloro-4,6-bis(hexylheptylamino)-s-triazine
2-chloro-4-diethylamino-6-dioctylamino-s-triazine
2-chloro-4-dihexylamino-6-dioctadecylamino-s-triazine 2-chloro-4-diamylamino-6-hexyldodecylamino-s-triazine
2-chloro-4-octyldecylamino-6-nonylheptadecylamino-s-triazine
2-chloro-4-decylpenta decylamino-6-methylnonyl-amino-s-triazine
2-chloro-4-ethylnonylamino-6-dihexylamino-s-triazine The compounds produced by the process of this invention have numerous uses as is well known in the art. For example, many of the compounds of this invention are useful as lubricants, functional fluids, fungicides, herbicides and bacteriostats.

What is claimed is:
1. Process of preparing an amino-s-triazine of the formula:

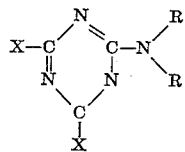

where X is a substituent selected from the group consisting of hydrogen, chlorine, bromine and

and where each R represents an alkyl radical of 1 to 18 carbon atoms which comprises reacting (a) an s-triazine of the formula

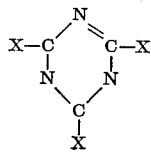

with (b) an amine of the formula:

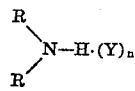

where X and R are defined as above, at least one X being selected from the group consisting of chlorine and bromine, $n$ is a whole number from 0 to 1, when $n$ is 0 the reactants are in a molar ratio of substantially 1 mol of (b) for each reactive halo group of (a), and when $n$ is 1 Y is selected from the group consisting of HCl and HBr, under substantially anhydrous conditions in the presence of an organic solvent at a temperature at which evolution of hydrogen halide selected from the group HCl and HBr and corresponding to the prior halogen selection of X above occurs, continuing the reaction until the evolution of hydrogen halide selected from the group HCl and HBr and corresponding to the prior halogen selection of X above substantially ceases and recovering the amino-s-triazine from the organic solvent.

2. The process of claim 1 wherein cyanuric chloride is reacted with said amine at a temperature above 120° C.

3. The process of claim 1 wherein a 2,4-dichloro-6-dialkylamino-s-triazine is reacted with said amine at a temperature above 165° C.

4. The process of claim 1 wherein a 2-chloro-4-dialkylamino-6-dialkylamino-s-triazine is reacted with said amine at a temperature above 200° C.

References Cited
UNITED STATES PATENTS
3,156,690  11/1964  Dexter et al. _____ 260—249.8

OTHER REFERENCES
Koopman, "Nieuive Herbicide 1,3,5-Triazine Derivaten," University of Groningen (1957), pp. 9–21.

WALTER A. MODANCE, *Primary Examiner.*
JOHN M. FORD, *Assistant Examiner.*